(12) United States Patent
Fang

(10) Patent No.: US 7,930,745 B2
(45) Date of Patent: Apr. 19, 2011

(54) NETWORK SECURITY SYSTEM AND METHOD

(76) Inventor: Ko-Cheng Fang, Taichung (TW)

( * ) Notice: Subject to any disclaimer, the term of this patent is extended or adjusted under 35 U.S.C. 154(b) by 871 days.

(21) Appl. No.: 10/425,537

(22) Filed: Apr. 28, 2003

(65) Prior Publication Data

US 2003/0208694 A1 Nov. 6, 2003

(30) Foreign Application Priority Data

May 3, 2002 (TW) .............................. 91109298 A

(51) Int. Cl.
G06F 12/14 (2006.01)
G06F 12/16 (2006.01)
G08B 23/00 (2006.01)

(52) U.S. Cl. ........................................ 726/23; 726/25
(58) Field of Classification Search ........................ None
See application file for complete search history.

(56) References Cited

U.S. PATENT DOCUMENTS

| | | | | |
|---|---|---|---|---|
| 5,974,549 A * | 10/1999 | Golan | ............................. | 726/23 |
| 6,148,342 A * | 11/2000 | Ho | ............................... | 709/225 |
| 6,301,668 B1 * | 10/2001 | Gleichauf et al. | .............. | 726/25 |
| 6,647,400 B1 * | 11/2003 | Moran | ........................... | 707/205 |
| 6,907,533 B2 * | 6/2005 | Sorkin et al. | ..................... | 726/22 |
| 6,910,135 B1 * | 6/2005 | Grainger | ......................... | 726/23 |

FOREIGN PATENT DOCUMENTS

| | | | |
|---|---|---|---|
| WO | WO 0034867 A1 * | 6/2000 |
| WO | WO 0062167 A1 * | 10/2000 |
| WO | WO 0104759 A1 * | 1/2001 |
| WO | WO 0106373 A1 * | 1/2001 |
| WO | WO 0133359 A1 * | 5/2001 |

* cited by examiner

*Primary Examiner* — Benjamin E Lanier
(74) *Attorney, Agent, or Firm* — Rabin & Berdo, P.C.

(57) ABSTRACT

A network security system and method for reacting to unauthorized data access in an inner data system by combining a redirect system is described. The examples of the redirect system include modified firewalls, IP sharing devices and gateways with examining mechanism. A user request is transmitted to the inner data system via the redirect system if the user request satisfies a certain safety condition. Otherwise, the user request is transmitted to a reaction system which provides virtual data similar to real data so that unauthorized users have the illusion of successfully hacking the inner data system. Meanwhile, the illegal activities are recorded and certain programs like Trojan programs can be used for executing reactions.

10 Claims, 5 Drawing Sheets

NETWORK SECURITY SYSTEM AND METHOD

BACKGROUND OF THE INVENTION

1. Field of Invention

The present invention relates to a network security system and method, and particularly relates to a network security system and method for recording and reacting to an unauthorized user.

2. Description of Related Art

Most computers, servers, and even personal communication devices, e.g. mobile phones, are connected to networks like the Internet, intranets, and telecommunication networks. In other words, networks have become an unavoidable tool in life. However, a network also exposes users thereof to various attacks. For example, data on the network can be destroyed, changed, or copied by hackers. Therefore, it is very important to provide a secure network environment. One popular approach to increase network security is to provide a firewall between a local company network and external networks like the Internet. The firewall system is used to filter information and control access.

There are two types of firewall systems, software firewall systems and hardware firewall systems. These firewall systems allow a system administrator to set certain safety conditions. For example, the firewall systems can be configured so that data packets from unknown addresses are filtered out, or some transmission ports of certain protocols are closed. However, all these approaches only focus on stopping first stage hacker attacks. Once the hacker satisfies a safety condition, the hacker can enter the network and do as he or she pleases. Hackers often try to break a security system by repeatedly testing passwords. Current firewall systems fail to detect and respond properly to this sort of early stage hackers in the early stage and respond properly. Once a hacker breaks the firewall system, the hacker also destroys all hacking data at the same time. In the other hand, simple attempt to test passwords for login cannot bring the hacker to legal resolution because the hacker does not do anything bad yet. Therefore, there are needs for improving the network security systems nowadays.

SUMMARY OF THE INVENTION

Therefore, one purpose of the present invention is to provide a system that is able to respond properly to activities of hackers in the early stage. The response of the system includes recording the activities of unauthorized users or activating certain reactions and data are not under dangered at the same time.

The first embodiment according to the present invention includes a reaction system and a redirect system. The redirect system is connected to an external network, a reaction system, and an inner data system, respectively. The redirect system receives a request of a user and the redirect system transmits the user request to the inner data system if the user request satisfies a certain safety condition, such as a password test. The inner data system then continues to process the user request.

If, however, the user request fails to satisfy the safety condition by, for example, failing a password request or SQL injection, the redirect system transmits the user request to the reaction system. The reaction system provides a response contents after receiving the user request. The response contents have a same format as response result of the inner data system if the user request is transmitted to the inner data system. Therefore, the user is not aware the hacking attempt has failed and continues to the next steps, such as data theft or destruction. Protected data is not endangered because the response contents of the reaction system comprise fake data, virtual data from system administrators, or trap programs with certain functions. In addition, the reaction system records the activities of unauthorized users or executes other reactions to ensure network security.

The second embodiment according to the present invention is adopted in an intranet. In addition, an examination module is selectively coupled to one of the reaction system, the redirect system, or the inner data system. Therefore, there are various combinations during implementation.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
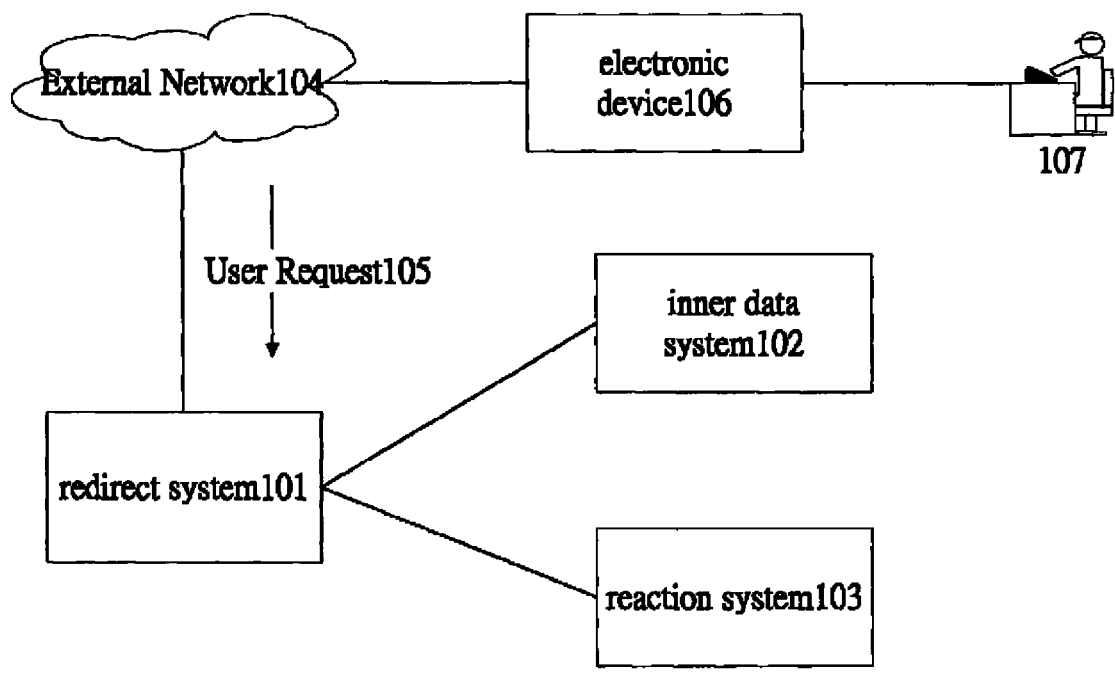
FIG. 1 illustrates a diagram of the first embodiment according to the present invention.

Reference will now be made in detail to the present preferred embodiments of the invention, examples of which are illustrated in the accompanying drawings. Wherever possible, the same reference numbers are used in the drawings and the description to refer to the same or like parts.

First Embodiment

Figure 2:
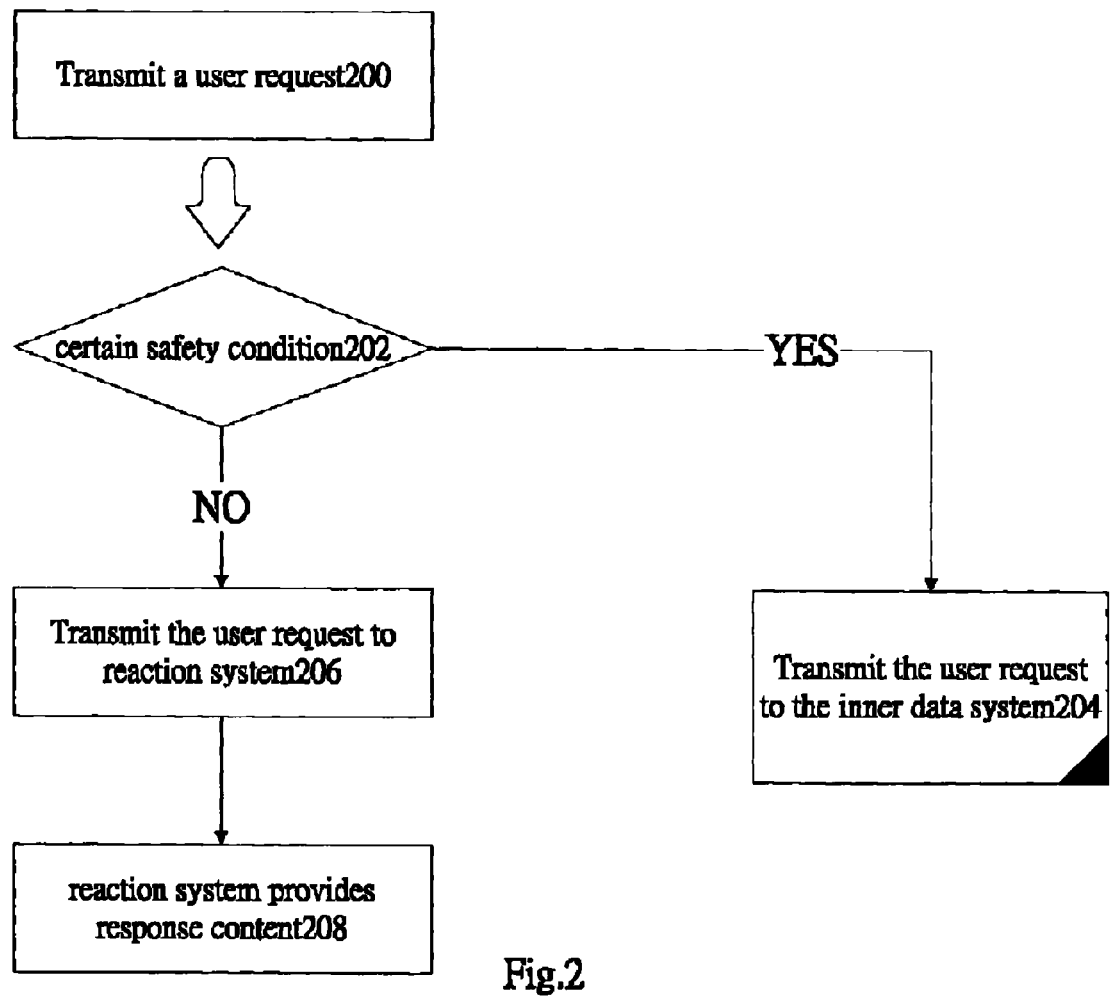
FIG. 2 illustrates a flowchart of the first embodiment.

In FIG. 1, a redirect system 101 is connected to an interface of an external network 104, an inner data system 102, and a reaction system 103 respectively, arranged in a star network with the redirect system 101 as the central node, or hub, and the interface of the external network 104, an inner data system 102, and a reaction system 103 as point nodes. FIG. 2 is a flowchart of the first embodiment. With simultaneous reference to both FIGS. 1 and 2, in normal situation, a user 107 uses an electronic device 106, e.g. a computer, transmits a user request 105 to the redirect system 101 via an interface to the external network 104 (step 200). If the user request 105 satisfies a certain safety condition (step 202), the redirect system 101 then transmits the user request 105 to the inner data system 102 (step 204) for further processing. Examples of the redirect system 101 include IP sharing devices, hardware firewall systems, software firewall systems or other systems having transmission ability according to certain protocols. Examples of the inner data system 102 include web servers, file servers, and any server or machine that provides users data under request.

However, if the user request 105 fails to satisfy the safety condition (step 202), which means unauthorized activity is occurring, the redirect system 101 does not reject the user request 105 directly. Instead, the user request 105 is transmitted to the reaction system 103 (step 206). The reaction system 103 then provides the user response contents according to the user request 105 with a predetermined method (step 208).

The response contents are adjusted so that they have the same format as what the inner data system 102 would provide the user according to the user request 105. Also, the star network allows the two-way communication link to the reaction system 103 to be the same as the link to the inner data network 102.

In other words, unauthorized users 107 fall under an illusion that they have successfully hacked the system because the reaction system 103 provides the unauthorized users 107 with data having a format similar to that of real data. If the unauthorized users continue illegal activities, the reaction system 103 records these activities and executes various reactions, such as calling the police and tracing related data of the unauthorized users 107 (e.g. IP address). Certainly, the reaction system 103 is able to begin recording activities for login attempts.

Important data, such as confidential data, are stored in the inner data system 102, but not the reaction system 103, and therefore, the first embodiment is able to record and respond properly to unauthorized activities with no risk to the important data. Accordingly, an effective way for ensuring network security is provided.

Figure 3A:
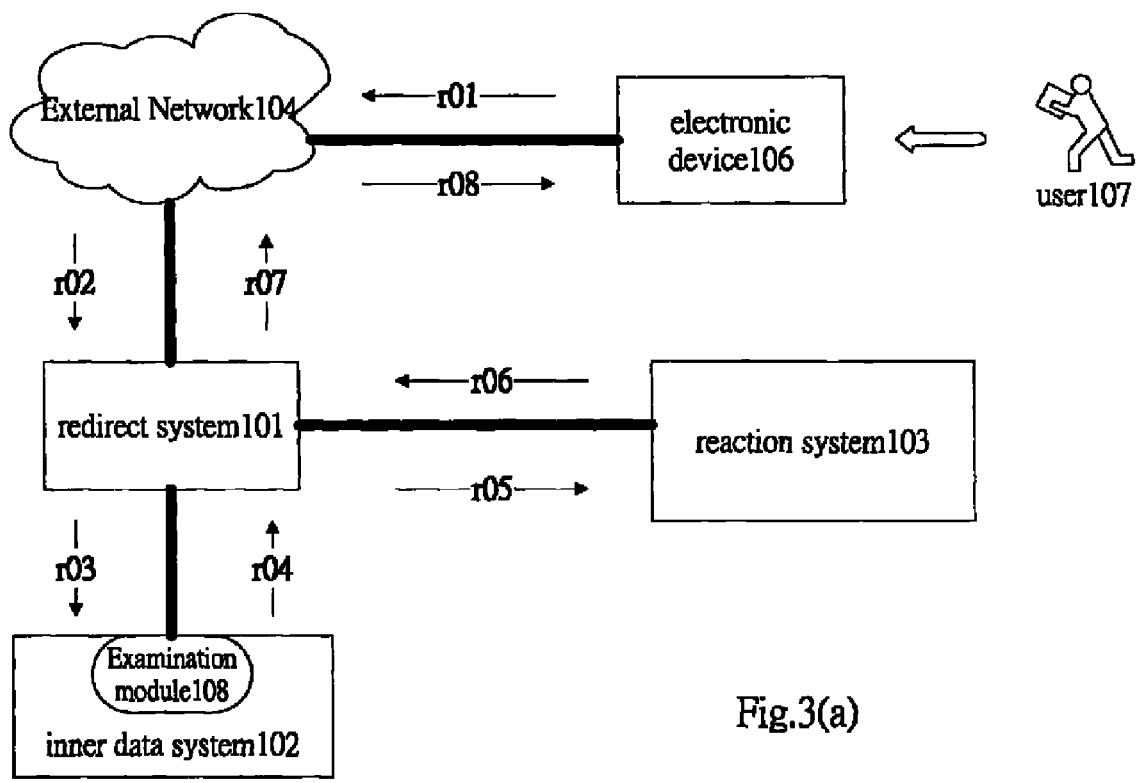
FIG. 3(a), (b), (c) illustrate implementations of the first embodiment.
Figure 3B:
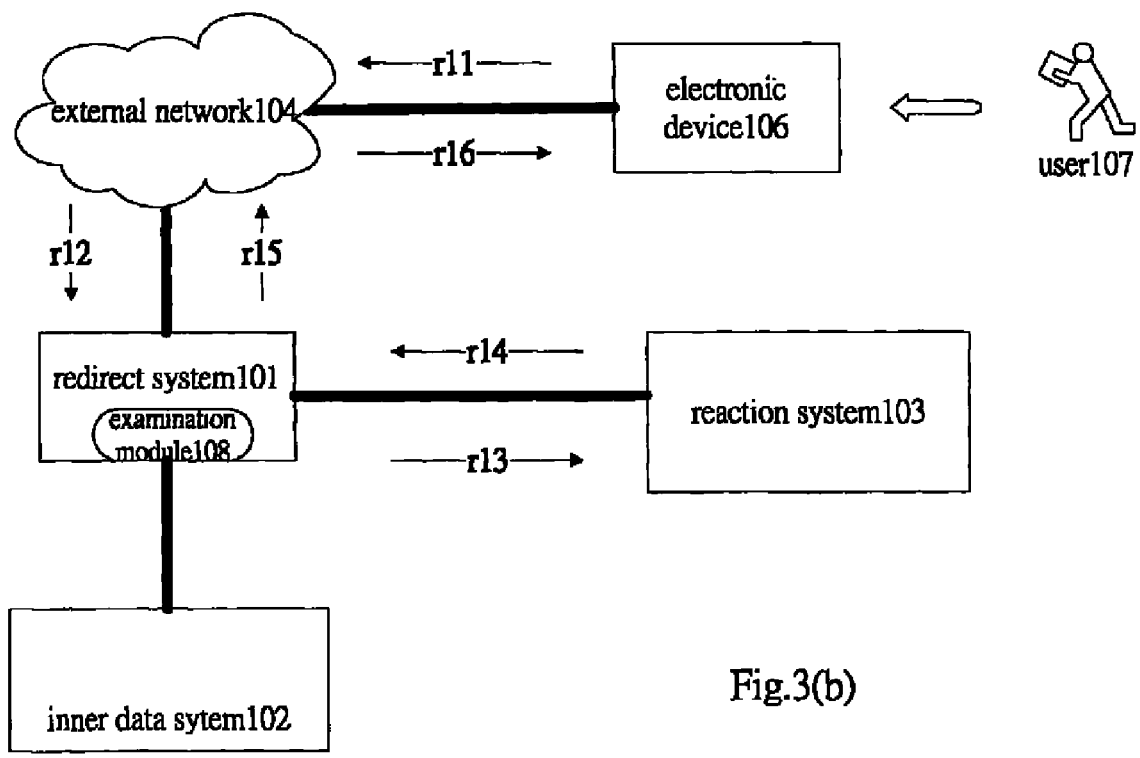
FIGS. 3(d), (e), (f) illustrate implementations of the second embodiment.
Figure 3C:
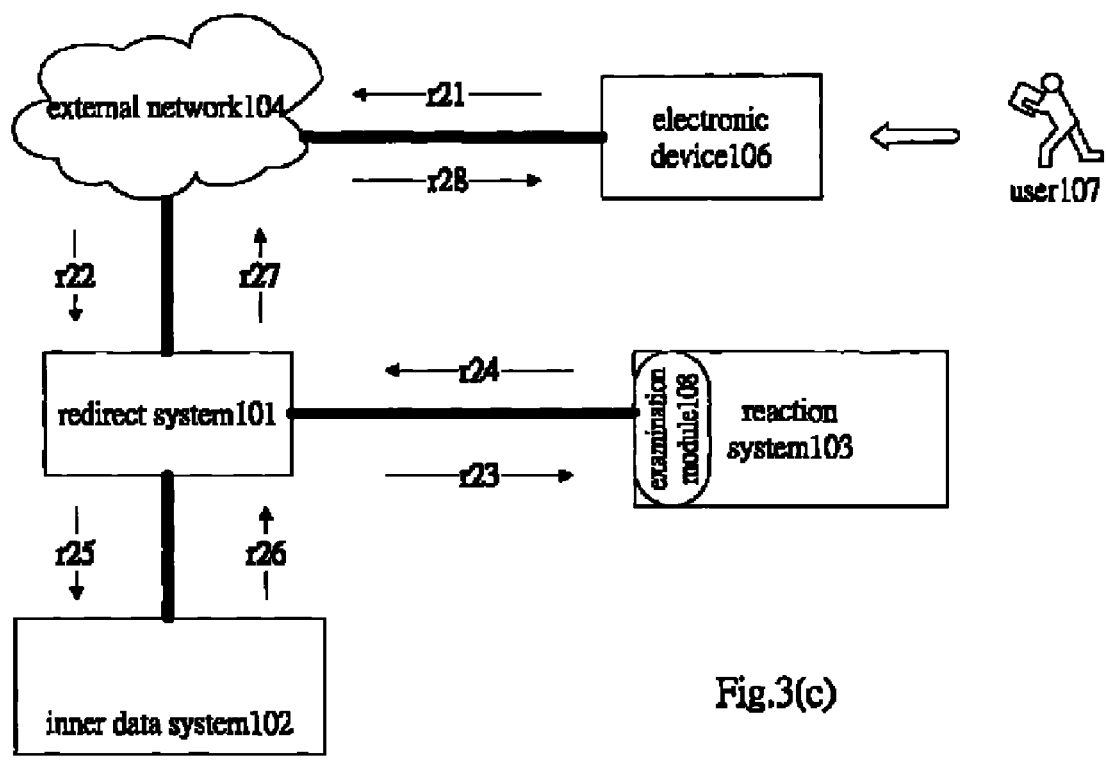

FIGS. 3(a)-3(c) show different combinations when an examination module 108 is added to the first embodiment shown in FIG. 1. The examination module 108 is used to examine whether the user request 105 satisfies the predetermined safety condition.

In FIG. 3(a), an examination module 108 is coupled to the inner data system 102. Firstly, an unauthorized user 107 issues a user request (step r01). The user request is transmitted to the redirect system 101 via an external network (step r02). The redirect system 101 then transmits the user request to the examination module 108 in the inner data system 102 (step r03). The examination module sends an examination result in the form of a control instruction to the redirect system 101 if the user request fails to satisfy the predetermined safety condition (step r04). Examples of the control instruction include setting mapping of transmission ports or IP. After receiving the examination result, the redirect system 101 transmits the request of the user to the reaction system 103 (step r05). The reaction system 103 responds to the user request and provides response contents according to the user request (step r06). The response contents are then transmitted to the external network 104 via the redirect system 101 (step r07). The response contents are then transmitted to the electronic device 106 via the external network 104 (step r08).

As mentioned above, the unauthorized user 107 now suffers the illusion of having successfully hacked the inner data system 102 and continues with further illegal activities. However, the reaction system 103 is ready to take action now as configured by the system administrator.

In FIG. 3(a), the examination module 108 has examples of, but is not limited to, modules that use password as access control. Normal servers, such as web site servers or file servers, use password mechanisms for protection. For such servers, the examination module according to the present invention enables redirect systems 101, like firewall systems, to reset the service IP and transmission ports to the reaction system 103 when users use invalid passwords, continuously or accumulatively, and exceed a certain number. Another example of the examination module 108 detects whether the electronic device 306 of the user 107 is in the safety list of machines after login failure by the user 107.

In addition, an embodiment of the reaction system 103 has an interface for system administrators to set necessary reaction programs. Examples of these reaction programs include recording unauthorized activities and tracing the IP address of the unauthorized user. Examples of the response contents of the reaction system 103 include fake data or virtual data that do not affect security prepared by the system administrators. Examples of the response contents also have added thereto reaction programs like virus codes or Trojan codes.

FIG. 3(b) illustrates embedding the examination module 108 in the redirect system 101. As in to FIG. 3(a), the user 107 sends a user request using the electronic device 106, and steps r11, r12, r13, r14, r15, and r16 are executed. As mentioned above, the reaction system 103 then starts various reactions as determined by the system administrator.

In the embodiment shown in FIG. 3(b), examples of the examination module 108 include, but are not limited to, modules that detect the identification code of the electronic device 106 of the user 107. In an example of this embodiment, the inner data system is not public to the outside but provides for certain electronic devices, such as ATMs or a mail server, via an external network. In such an example, the examination module 108 examines the identification code of the electronic device 106 that issues the user request to determine whether it is an authorized machine. Examples of this identification code include identification codes combined with IP addresses, processor identification codes, or other data. In addition, the identification codes can be encrypted and changed from time to time so that it is not easy for hackers to break the codes.

FIG. 3(c) provides an example for embedding the examination module 108 in the reaction system 103. In this example, the user 107 sends a user request using the electronic device 106 and then steps r21, r22, r23 are executed. The examination module 108 transmits the examination result to the redirect system 101 (step r24). The examination result is formatted as a control instruction for setting the operation mode of the redirect system 101. Redirect system 101 then transmits the user request to the inner data system 102 and steps r25, r26, r27 are then executed. Finally, the electronic device 106 sends the response result to the user 107 via the external network. The reaction system 103 elicits various reactions as set by the system administrator if the user request fails to satisfy the safety condition.

Examples of the examination module 108 also include an independent electronic device.

The Second Embodiment

Figure 3D:
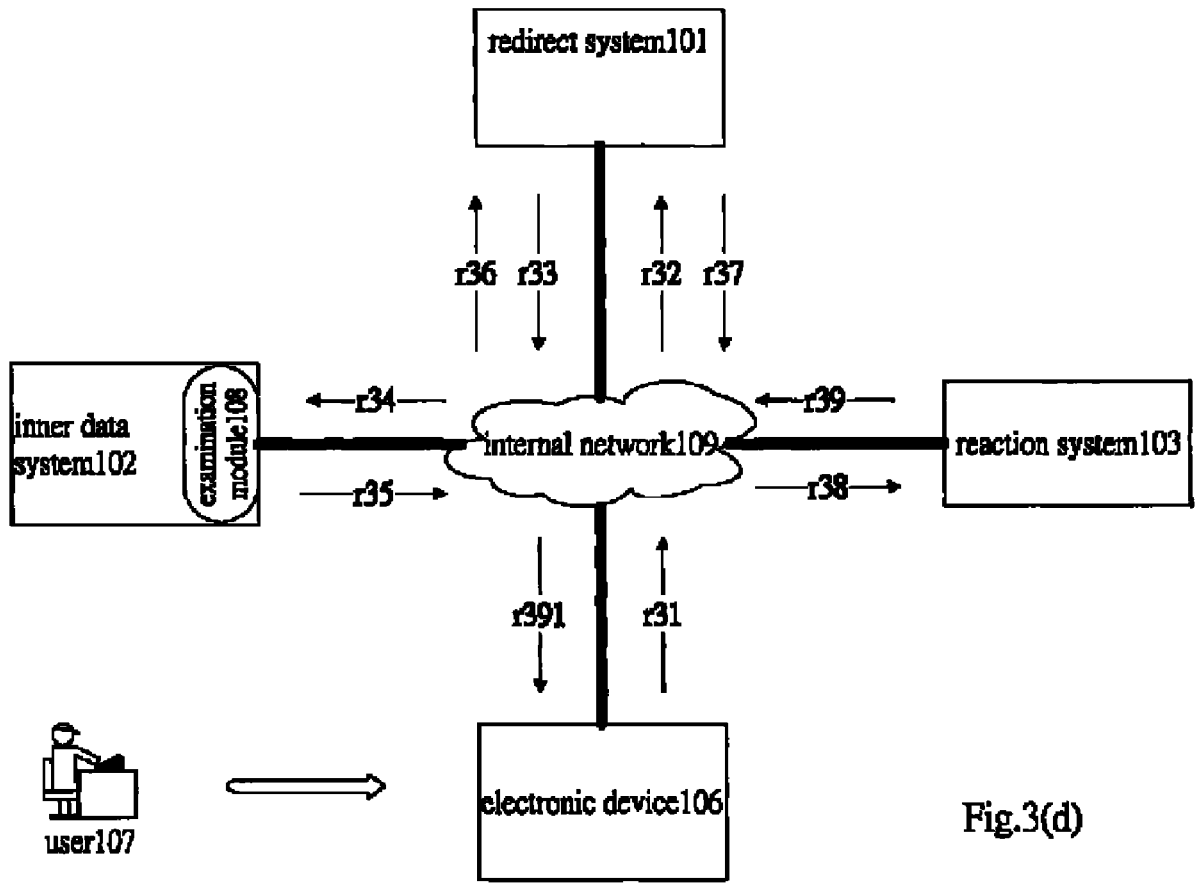
Figure 3E:
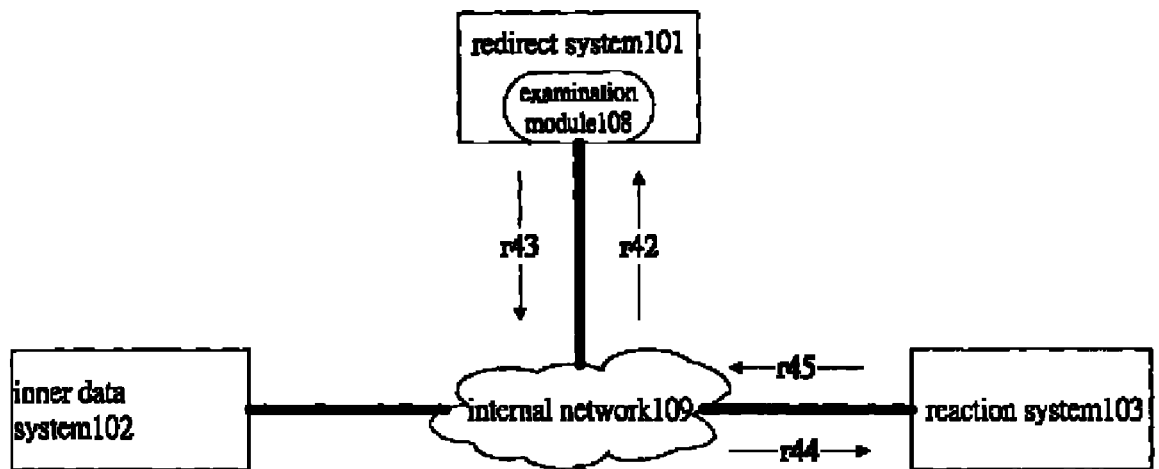
Figure 3F:
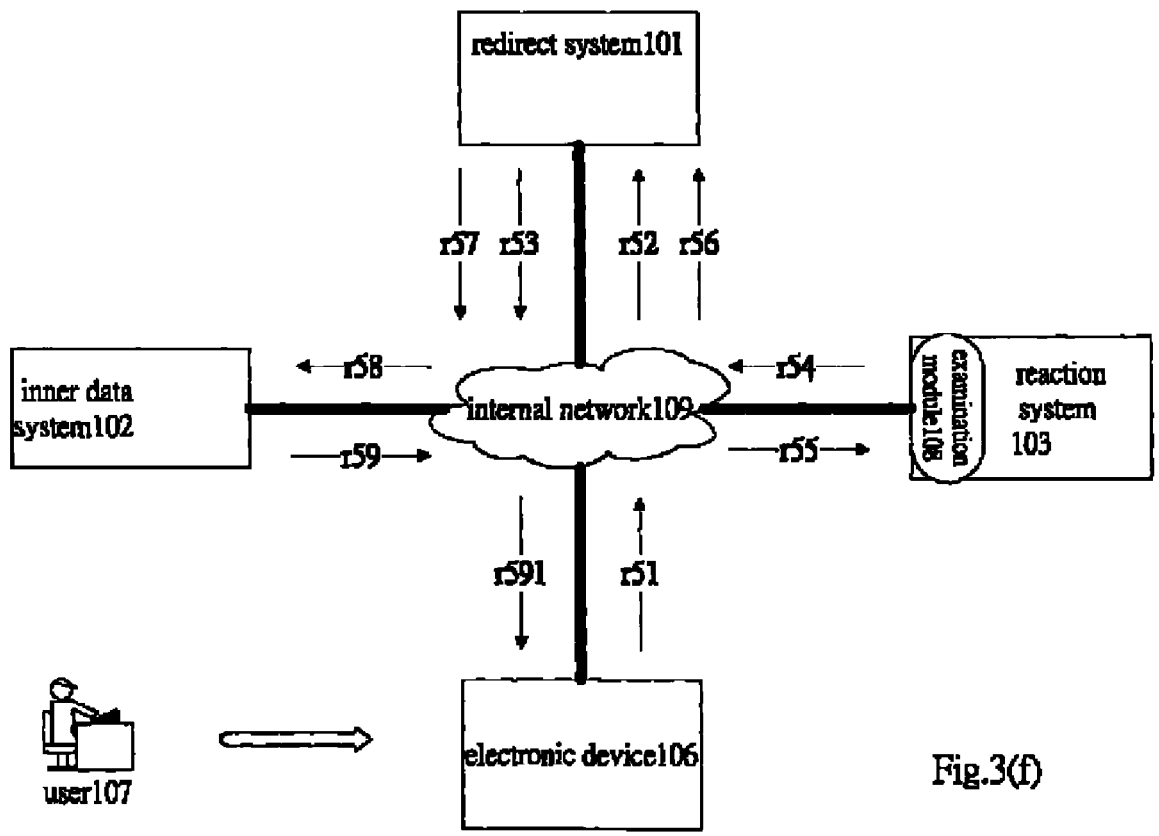

FIGS. 3(d)-3(f) explain the second embodiment of the present invention. In this embodiment, and explanation of how the present invention can be used in an intranet is given. For simplicity, identical notations indicate identical or similar structures.

In FIGS. 3(d)-3(f), the redirect system 101, the inner data system 102, the reaction system 103 and the electronic device 106 are connected to an internal network 109 in a star network with the internal network 109 as the central node, or hub, and the redirect system 101, inner data system 102, and reaction system 103 as point nodes. The examination modules 108 are embedded in inner data system 102, redirect system 101, and the reaction system 103 in FIG. 3(d)-FIG. 3(f), respectively. Examples of the inner network 109 include various wire or wireless networks, TCP/IP networks, telecommunication networks, or other network media providing communication functions.

In the example illustrated in FIG. 3(d), the user 107 sends a user request using the electronic device 106 to the internal network 109, and steps r31, r32, r33, r34, r35, r36, r37, r38, r39 are then executed. Then, the user 107 receives the response contents through the electronic device 106 via the internal network 109 (step r391).

As mentioned above, the unauthorized user 107 suffers the illusion of having successfully hacked the inner data system 102 and continues illegal activities. At this moment, the reaction system 103 starts various reactions as set by the system administrator.

In FIG. 3(*e*), the examination module 108 is embedded in the redirect system 101. Reactions corresponding to failure attempts of unauthorized user 107 include steps r41, r42, r43, r44, r45, and r46. The details of operation are similar to those described with reference to FIG. 3(*b*).

In FIG. 3(*f*), the examination module 108 is embedded in the reaction system 103. The user request by an authorized user 107 follows steps r51, r52, r53, r54, r55, r56, r57, r58, r59, r591. In contrast, the reaction system 103 starts various reactions if the user 107 is not authorized. This example is similar to that described with reference to FIG. 3(*c*), and no further description is given.

It is to be noted that diagrams of functional blocks are used to explain the present invention but not to limit the scope of the present invention as shown in FIGS. 1, 2, and 3(*a*)-(*f*). For example, the reaction system 103 can be coupled to the redirect system 101 and the inner data system 102 separately or together. The redirect system 101 can be coupled to redirect system 103 and the inner data system 102 separately or together. The inner system 102 can also be coupled to redirect system 101 and the reaction system 103 separately or together.

In addition, connections between the redirect system 101, reaction system 103, inner data system 102 and external system 104 can be of wire, wireless, direct, or indirect forms. Further, the inner data system 102 can be a plurality of inner servers and is not limited in number to one.

In addition, the external network 104 and the internal network 109 can be the Internet, intranets, wireless networks, telecommunication networks, and other similar networks. The user request 105 include file transfer protocols (FTP), hypertext transfer protocols (HTTP), network neighboring ??? and others based on IP packets.

Examples of the redirect system 101 include hardware firewalls and software firewalls, and IP sharing devices. The inner data system 102 includes web servers, file servers, database servers and personal computers. The electronic device 106 includes personal computers, personal digital assistant, mobile phones and workstations.

Examples of the aforementioned safety condition include determining whether number of login attempts using an invalid password has exceeded a predetermined limit and receiving an unknown identification code from machine 106. The safety condition can also be set as a portion of commands for accessing data by system administrators, for example, a subset of commands or instructions in HTTP but not all being allowed.

The predetermined reaction method of the reaction system 103 can also be set by a system administrator, or be configured directly in the reaction system 103. In addition, the predetermined reaction method of the reaction system 103 can also be set to record illegal activities of unauthorized users and therefore, legal action can be brought against unauthorized users. Further, the predetermined reaction method of the reaction system 103 can also include tracing the user 107 to obtain related data such as an IP address.

The response contents provided by the reaction system 103 include virtual data similar to real data in the inner data system 102 so that these virtual data do not reveal any confidential information. Further, the response contents can include tracing programs like Trojan programs which run in the user's computer.

Further, so as to ensure sufficient bandwidth of the network for normal communications, the redirect system 102 in another embodiment according to the present invention has a management interface so that system administrators can set a maximum number for reacting unauthorized users. When the unauthorized attempts exceed the maximum number, the attempts are rejected.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A network security system for controlling access to an inner data system, said network security system comprising:
    an examination module for receiving a user access request to enter the inner data system, the user access request including a user name and password, checking the validity of the user name and password by the examination module, and generating an examination result that includes control instructions generated as a function of said checking;
    a redirect system for receiving and executing the control instructions generated by the examination module, wherein the control instructions will instruct the redirect system to transfer the user into the inner data system if the examination result shows that the user name and password are valid; and
    a reaction system for receiving the user access request from the redirect system when the examination result shows that the password is not valid, the reaction system being configured to respond to the user access request by providing response content which includes virtual data that has the same format as information contained within the inner data system,
    wherein the reaction system is further configured to record at least one successive action after the response content is transmitted from the reaction system,
    wherein the reaction system is further configured to execute one or more reaction programs designed to trace the IP address from which the user access request originated, and to send a Trojan code to the IP address from which the user access request originated, and
    wherein users are permitted only a limited number of attempts for the password, and according to the number of attempts at the password, the redirect system will direct an authorized user to an operating system associated with the inner data system and will direct an unauthorized user to the redirect system.

2. The network security system of claim 1,
    wherein the user access request includes an identification code, which identifies a device from which the user access request originates, and
    wherein the redirect system will transfer the user into the reaction system if a plurality of user access requests included the same identification code and used invalid user passwords.

3. The network security system of claim 1, wherein the network security system starts a hacking prevention procedure before an intruder starts modifying real data that is stored in the inner data system.

4. The network security system of claim 1, wherein the examination module is provided in the inner data system.

5. A network security system for controlling access to an inner data system, said network security system comprising:
- an examination module for receiving a user access request to enter the inner data system, the user access request including an identification code that identifies a device from which the user access request originated and also including a password, the examination module checking the validity of the password and generating an examination result that includes control instructions generated as a function of said determination;
- a redirect system for receiving and executing the control instructions generated by the examination module, wherein the control instructions will instruct the redirect system to transfer the user into the inner data system if the examination result indicates that the password is valid; and
- a reaction system for receiving the user access request from the redirect system when the control instructions indicate that a predetermined plural number of user access requests included the same identification code and incorrect passwords, the reaction system being configured to include virtual data that has the same format as information contained within the inner data system,
- wherein users are permitted only a limited number of attempts for the password, and according to the number of attempts at the password, the redirect system will direct an authorized user to an operating system associated with the inner data system and will direct an unauthorized user to the redirect system and send a Trojan code to the unauthorized user.

6. The network security system of claim 5, wherein the reaction system is further configured to record at least one action conducted by an unauthorized user whose user access request has been received by the reaction system.

7. The network security system of claim 5, wherein the examination module is provided in the inner data system.

8. A network security system for controlling access to an inner data system, said network security system comprising:
- a reaction system that includes virtual data that has the same format as information contained within the inner data system;
- an examination module for receiving a user access request to enter the inner data system, the user access request including an identification code that identifies a device from which the user access request originated and also including a password, the examination module checking the validity of the password and generating an examination result that includes control instructions generated as a function of said determination; and
- a redirect system for receiving and executing the control instructions generated by the examination module,
- wherein the control instructions will instruct the redirect system to transfer the user access request to the inner data system if the examination result indicates that the password is valid or to transfer the user access request to the reaction system and send a Trojan code to the device from which the user access request originated if the control instructions indicate that a predetermined plural number of user access requests included the same identification code and incorrect passwords.

9. The network security system of claim 8, wherein the reaction system is further configured to record at least one action conducted by an unauthorized user whose user access request has been received by the reaction system.

10. The network security system of claim 8, wherein the examination module is provided in the inner data system.

\* \* \* \* \*